United States Patent
Raghavan

(10) Patent No.: US 6,363,261 B1
(45) Date of Patent: Mar. 26, 2002

(54) EXTENDED RANGE CONCENTRIC CELL BASE STATION

(75) Inventor: Ramabadran S. Raghavan, Flanders, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,788

(22) Filed: Aug. 31, 1998

(51) Int. Cl.⁷ .................................................. H04Q 7/30
(52) U.S. Cl. .................... 455/561; 455/449; 455/515; 370/335; 370/337; 375/150
(58) Field of Search ............................. 455/422, 423, 455/424, 434, 456, 561, 515, 334, 443–4.69; 370/350, 335, 337, 252; 375/150

(56) References Cited

U.S. PATENT DOCUMENTS

| | | | |
|---|---|---|---|
| 5,103,459 A | | 4/1992 | Gilhousen et al. .............. 375/1 |
| 5,483,537 A | * | 1/1996 | Dupuy ........................ 370/337 |
| 5,544,171 A | | 8/1996 | Godecker .................... 370/95.3 |
| 5,710,768 A | | 1/1998 | Ziv et al. ...................... 370/342 |
| 5,748,891 A | * | 5/1998 | Fleming et al. .............. 375/150 |

FOREIGN PATENT DOCUMENTS

| | | | |
|---|---|---|---|
| EP | 0 565 507 A2 | 4/1993 | .......... H04Q/7/005 |
| EP | 0 653 893 A1 | 11/1994 | .......... H04Q/7/20 |
| WO | WO 5/02306 | 6/1994 | .......... H04Q/7/26 |

* cited by examiner

Primary Examiner—William Trost
Assistant Examiner—Philip J. Sobutka

(57) ABSTRACT

The present invention is an extended range concentric cell base station and a method for extending a cell size or access range without incurring ASIC correlator re-design. This is accomplished with a concentric cell base station design that incorporates multiple timing protocols and search windows. The concentric base station has associated a micro cell and a macro cell, wherein the micro and macro cells use a same frequency band but different timing protocols and search windows that will cause signals transmitted by mobile-telephones within their respective cells to be received within the confines of at least one search window.

13 Claims, 7 Drawing Sheets

EXTENDED RANGE CONCENTRIC CELL BASE STATION

FIELD OF THE INVENTION

The present invention relates generally to wireless communications systems and, in particular, to extending access ranges of wireless communications systems.

BACKGROUND OF THE INVENTION

FIG. 1 depicts a wireless communications system 10 employing Code Division Multiple Access (CDMA) techniques based on the well-known IS-95 standard of the Telecommunication Industrial Association. The wireless communications system 10 comprises a mobile switching center (MSC) 12 and a plurality of base stations (BS) 14-i connected to the MSC 12. Each of BS 14-i provides wireless communications services to mobile-telephones (MT), such as mobile-telephones 16-k, within an associated geographical coverage area referred to herein as cell 18-i with a radius $R_i$. For illustrative purposes, cells 18-i are depicted as circular in shape with base stations 14-i centrally positioned. It should be understood that cells 18-i may also be non-circular in shape (e.g., hexagonal) with the base stations positioned non-centrally, and that the term "radius $R_i$" should be construed to define a distance between the base station and a point on the circumference of cell 18-i (which will vary depending on the particular point on the circumference).

Each base station 14-i includes radios and antennas for modulating and transmitting base station signals to mobile-telephones, and for receiving and demodulating mobile-telephone signals from mobile-telephones within its associated cell 18-i. Each base station 14-i further includes a receiver for receiving timing information using the well-known Global Positioning Satellites (hereinafter referred as a "GPS receiver").

Signals are transmitted by base stations 14-i and mobile-telephones in accordance with a timing protocol aligned with GPS time using the GPS receiver. FIG. 2 depicts a timing schedule 20 incorporating an implementation of a timing protocol based on the IS-95 standard. The timing schedule 20 comprises a series of frames 22-n, wherein each frame 22-n spans a time interval t. The beginning of each frame 22-n is marked by a frame boundary at time $T_n$ aligned to GPS time. In accordance with the timing protocol, base stations 14-i are configured to begin transmitting base station signals at the frame boundaries, wherein the base station signals include zero or more information bearing signals and a pilot signal for coherent demodulation of the information bearing signals by the mobile-telephones and system access operations. By contrast, mobile-telephones 16-k are configured to begin transmitting mobile-telephones signals at some multiple x of a frame time period (i.e., tx) after mobile-telephones 16-k began receiving base station signals, where x is some integer greater than or equal to zero. Unlike base station signals, mobile-telephone signals include one or more information bearing signals and no pilot signal, and are encoded using a set of orthogonal codes (referred to as Walsh codes) combined with a pseudo-noise (PN) sequence (or a known code) such that the information bearing signal may be non-coherently demodulated. The PN sequence comprises random 0 and 1 digital signals, wherein the duration for a 0 or 1 to transmit is referred to herein as a PN chip.

The above described timing protocol will now be discussed in reference to FIG. 3, which depicts a time chart 28 illustrating a sequence of transmissions and receptions by base station 14-i and mobile-telephone 16-k. At time $T_1$, BS 14-i begins transmitting base station signal $S_1$ to MT 16-k, which may be located anywhere in cell 18-i. MT 16-k begins receiving signal $S_1$ at time $T_1 + d_{BS \rightarrow MT}$, where $d_{BS \rightarrow MT}$ is a propagation delay from BS 14-i to MT 16-k. Note that the term propagation delay should be construed to include line-of-sight and non-line-of-sight propagation delays.

MT 16-k will wait a time interval tx from when MT 16-k began receiving signal $S_1$ before it begins transmitting mobile-telephone signal $S_2$. Thus, MT 16-k will begin transmitting signal $S_2$ at time $T_1 + d_{BS \rightarrow MT} + tx$ (or time $d_{BS \rightarrow MT}$ after some frame boundary). For example, if x=2, then MT 16-k transmits signal $S_2$ at time $T_3 + d_{BS \rightarrow MT}$ (or two frames after receiving the base station signal $S_1$).

Due to a propagation delay $d_{MT \rightarrow BS}$ from MT 16-k to BS 14-i, BS 14-i will begin receiving signal $S_2$ at time $T_1 + d_{BS \rightarrow MT} + tx + d_{MT \rightarrow BS}$. For ease of discussion, it is assumed that the propagation delay $d_{MT \rightarrow BS}$ from MT 16-k to BS 14-i is the same as the propagation delay $d_{BS \rightarrow MT}$, and both will hereinafter be referred to individually as a one way propagation delay $d_{ow}$, i.e., $d_{ow} = D_{MT \rightarrow BS} = d_{BS \rightarrow MT}$, or collectively as a round trip propagation delay $2d_{ow}$. Thus, BS 14-i will begin receiving signal $S_2$ at time $T_1 + tx + 2d_{ow}$.

In order to demodulate the received signal $S_2$, BS 14-i must first detect signal $S_2$. Each radio includes a correlator, which is a device that detects mobile-telephone signals. For example, the correlator detects mobile-telephone signal $S_2$ by multiplying an incoming signal by the PN sequence, where the PN sequence is time shifted in discrete steps over a period or time interval (referred to herein as a search window $W_n$) until the resulting product (of the PN sequence and the incoming signal) exceeds a threshold indicating the detection of mobile-telephone signal $S_2$. If BS 14-i does not begin to receive signal $S_2$ within the confines of a search window $W_n$, BS 14-i will not be able to detect signal $S_2$ (using the timing protocol incorporated in FIG. 2).

To ensure that BS 14-i begins receiving signal $S_2$ within the confines of search windows $W_n$, search windows $W_n$ should span time intervals that include possible arrival times for signal $S_2$ (traveling a straight line or line-of-sight path between the mobile-telephone and the base station) regardless of the position of mobile-telephone 16-k in cell 18-i. Based on the above described timing protocol, base station 14-i can expect to receive signal $S_2$ no earlier than the frame boundary and no later than time $2d_{ow\text{-}radius}$ after the frame boundary, where $d_{ow\text{-}radius}$ is the one way propagation delay (or $2d_{ow\text{-}radius}$ is the round trip propagation delay) for a signal traveling a distance equal to the radius $R_i$. Thus, search windows $W_n$ should span a duration of at least 2 $d_{ow\text{-}radius}$ beginning at time $T_n$ and ending no earlier than time $T_n + 2 d_{ow\text{-}radius}$. In effect, the duration of search windows $W_n$ restricts the effective radius (or size) of cell 18-i, which is also referred to herein as the access range of a base station.

The duration of search windows $W_n$ depends on the implementation of the correlator. Typically, correlators are implemented in the form of an Application Specific Integrated Circuit (hereinafter referred to as an "ASIC correlator") having a predetermined number of bits (also referred to herein as a "bit limitation") for representing a round trip delay (of a signal traveling from the base station to the mobile-telephone and back to the base station). Such bit limitation limits the duration of the search windows which, as discussed above, limits the effective size of cell 18-i or access range of the base station 14-i. As long as the bit limitation does not limit search windows $W_n$ to a duration of less than 2 $d_{ow\text{-}radius}$, base station 14-i should be able to detect signal $S_2$ transmitted by any mobile-telephone located anywhere within its cell 18-i (assuming that $R_i$ is the same for all points on the circumference).

Typical implementations of base stations in an IS-95 based CDMA wireless communications system include an ASIC correlator having a 12-bit limitation for representing the round trip delay. In order to have fine resolution of delay, a typical value of 1/8 PN chip is used as the minimum resolution unit. The 12-bit limitation (or round trip delay representation) in units of 1/8 PN chips yields a range of 512 PN chips (i.e., $2^{12}$ bits×1/8 PN chips/bits). For a transmit bandwidth of 1.2288 MHz (which is typical for an IS-95 based CDMA wireless communications system), the 12-bit limitation can represent a round trip delay of 416 $\mu$s (i.e., 512 PN chips÷1.2288 PN chips/$\mu$s). With air propagation speed of 5.33 $\mu$s/mile, the 416 $\mu$s round trip delay (or 208 $\mu$s one way delay) represents the limitation that if a mobile-telephone is located approximately 39 miles (i.e., 208 $\mu$s÷5.33 $\mu$s/mile) from the base station, the mobile-telephone is capable of communicating with the base station if the radio path loss is acceptable and the search window is configured correctly—that is, the 12-bit limitation (or 512 time chip delay index representation) allows for a cell with a maximum radius $R_i$ (or a maximum round trip delay) of approximately 39 miles. A signal transmitted by a mobile-telephone beyond 39 miles of BS 14-i, in accordance with the prior art timing protocol, may not arrive at BS 14-i within the confines of any search windows $W_n$ and, thus, will not be reliably detectable with the 12-bit ASIC correlator.

Presently, if the cell size or access range is to be extended beyond the 12-bit limitation of the ASIC correlator (i.e., beyond 39 miles), the ASIC correlator would have to be re-designed. Specifically, the ASIC correlator would have to be re-designed to increase its bit limitation such that signals transmitted by mobile-telephones positioned beyond the access range 12-bit limitation of the ASIC correlator may also be detected. ASIC correlator re-design, however, is undesirable and may not be economical for small scale of applications. Therefore, there exist a need to extend the cell size or access range of the base station without incurring the high costs associated with ASIC correlator re-design.

SUMMARY OF THE INVENTION

The present invention is an extended range concentric cell base station and a method for extending a cell size or access range without incurring ASIC correlator re-design. This is accomplished with a concentric cell base station design that incorporates multiple timing protocols and search windows. The concentric base station has associated a micro cell and a macro cell, wherein the micro and macro cells use a same frequency band but different timing protocols and search windows that will cause signals transmitted by mobile-telephones within their respective cells to be received within the confines of at least one search window. In one embodiment, the micro cell uses the timing protocol of the prior art with a first search window that begins at the frame boundary and ends at some time $p_1$ after the frame boundary, wherein $p_1$ represents a time interval corresponding to a bit limitation of an ASIC correlator being used to represent the first search window. By contrast, the macro cell uses a modified timing protocol and a second search window that begins after the frame boundary but no later than the time $p_1$ after the frame boundary (i.e., no later than the end of the first search window) and ends at some time $p_2$ after the second search window began, wherein the modified timing protocol will cause the signals transmitted by mobile-telephones in the macro cell to be received within the confines of the second search window and $p_2$ represents a time interval corresponding to a bit limitation of an ASIC correlator being used to represent the second search window.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
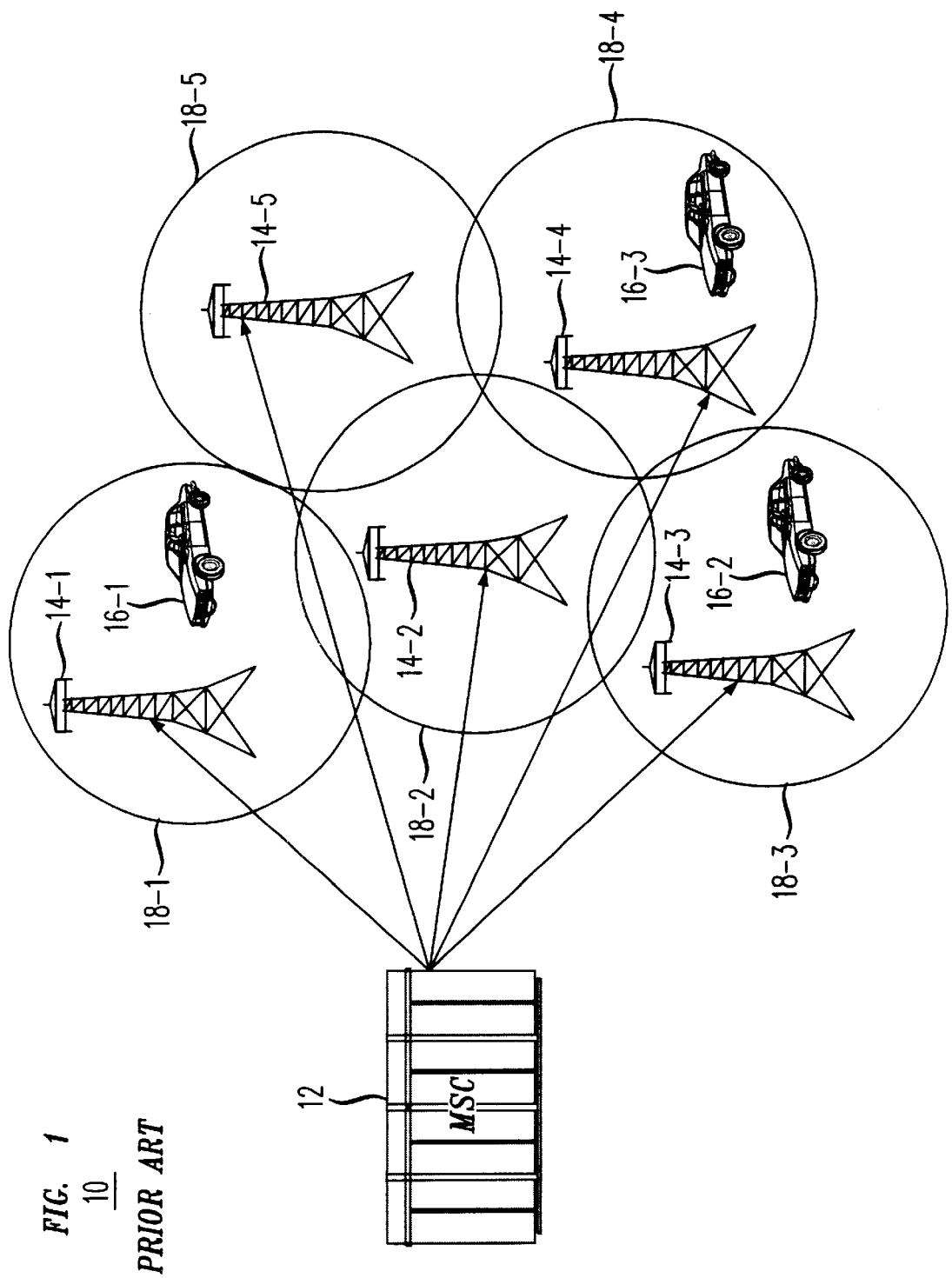
FIG. 1 depicts a wireless communications system employing Code Division Multiple Access (CDMA) techniques based on the well-known IS-95 standard.
Figure 2:
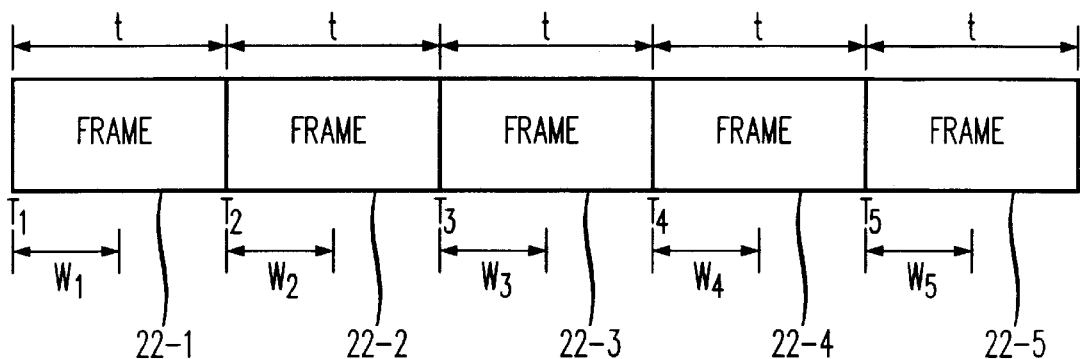
FIG. 2 depicts a timing schedule used in accordance with one implementation of a timing protocol based on the IS-95 standard.
Figure 3:
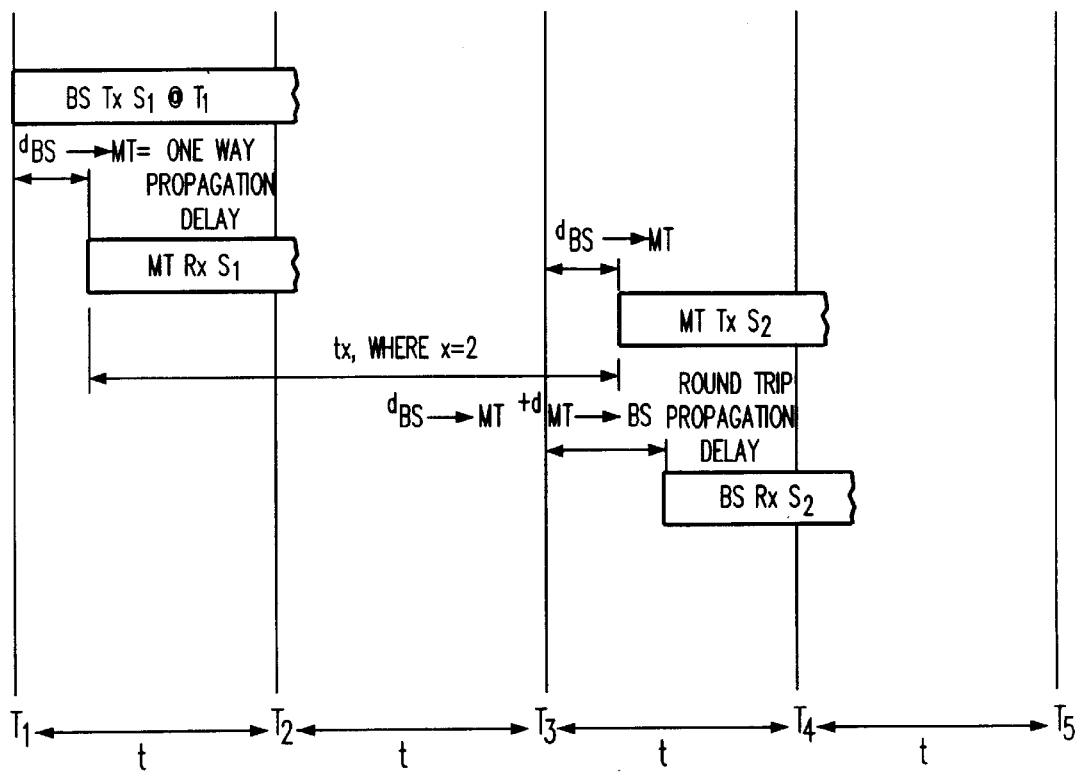
FIG. 3 depicts a time chart illustrating a sequence of transmissions and receptions by base station and mobile-telephone in accordance with the timing schedule of FIG. 2.
Figure 4:
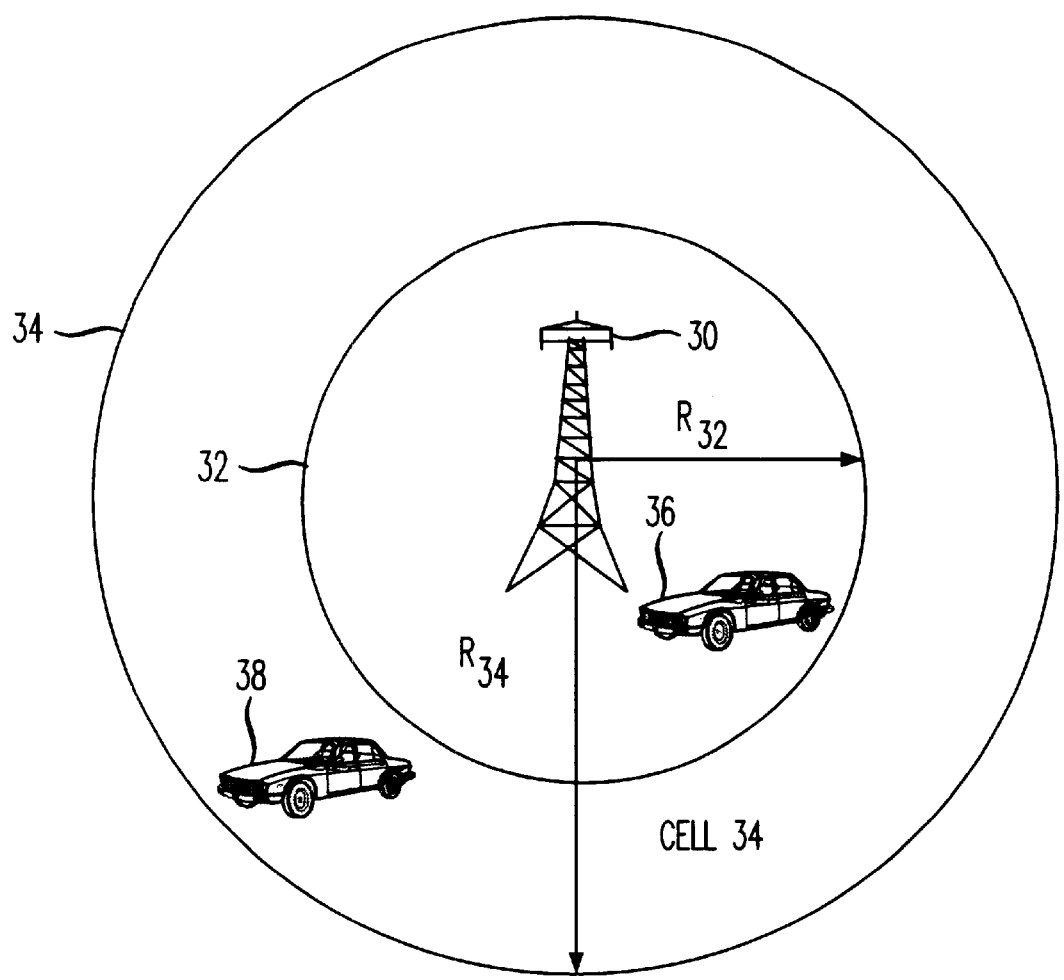
FIG. 4 depicts a base station based on the well-known IS-95 standard for Code Division Multiple Access used in accordance with the present invention.

FIG. 4 depicts a base station 30 based on the well-known IS-95 standard for Code Division Multiple Access used in accordance with the present invention. Base station 30 includes radios and antennas for modulating and transmitting base station signals to mobile-telephones and for receiving and demodulating mobile-telephone signals from mobile-telephones within cell 34, and a GPS receiver for receiving timing information using the well-known Global Positioning Satellites. Each radio includes a correlator implemented in the form of an ASIC (hereinafter referred to as an "ASIC correlator") operable to detect mobile-telephone signals such that the mobile-telephone signals may be demodulated.

For purposes of discussion, the ASIC correlator has a 12-bit limitation (or 512 PN chips) for representing a round trip delay (of a signal traveling from base station 30 to a mobile-telephone and back to base station 30), as described in the background section. This should not be construed to limited the present invention to ASIC correlators with 12-bit limitations. It will be clear to one of ordinary skill in the art that the present invention is equally applicable to base stations having ASIC correlators with other bit limitations or correlators implemented in a form other than an ASIC. A 12-bit (or 512 PN chips) ASIC correlator has a search window $W_n$ of approximately 416 μs in duration. In prior art CDMA wireless communications systems using a timing protocol based on the IS-95 standard, such search window $W_n$ is configured to begin at time $F_n$ (marking the beginning of frames) and end at time $F_n$+416 μs, and would allow base station 30 to detect a signal transmitted from mobile-telephones located within approximately 39 miles of base station 30. Thus, a mobile-telephone beyond 39 miles of base station 30 would be considered beyond the access range of base station 30 equipped with a 12-bit ASIC correlator.

Cell 34 has an outer radius $R_{outer}$ (or $R_{34}$) and an inner radius $R_{inner}$ (or $R_{32}$), wherein outer radius $R_{outer}$ may be or is a distance beyond the access range of the ASIC correlator bit limitation (e.g., $R_{outer}$>39 miles for an ASIC correlator with a 12-bit limitation), inner radius $R_{inner}$ is less than $R_{outer}$, and the difference ΔR between radii $R_{outer}$ and $R_{inner}$ should be no greater than the distance (or maximum round trip delay) corresponding to the ASIC correlator bit limitation (e.g., ΔR<39 miles). Thus, part of cell 34 may be beyond the access range of the ASIC correlator bit limitation in accordance with the subject invention.

The present invention allows base station 30 to detect signals transmitted from mobile-telephones located anywhere in cell 34, including beyond the access range of its ASIC correlator bit limitation (e.g., beyond 39 miles), without ASIC correlator re-design. The present invention is accomplished using a modified timing protocol that will cause search windows to shift with respect to frame boundaries, thereby causing signals transmitted by mobile-telephones positioned beyond the bit limitation of the ASIC correlator to be received within the search windows. This involves transmitting a base station signal at a time r relative to frame boundaries and configuring search windows $W_n$ to begin and end at a time q and q+p, respectively, after the time r, wherein q is a timing advance value greater than zero representing a propagation delay corresponding to a signal traveling no more than round trip between the base station and the inner radius of cell 34 (i.e., q corresponds to a propagation delay for a distance greater than zero but no more than twice inner radius $R_{inner}$) and p represents a time interval corresponding to the ASIC correlator bit limitation or a time interval over which a mobile-telephone signal may be correlated and thereby detected.

Figure 5:
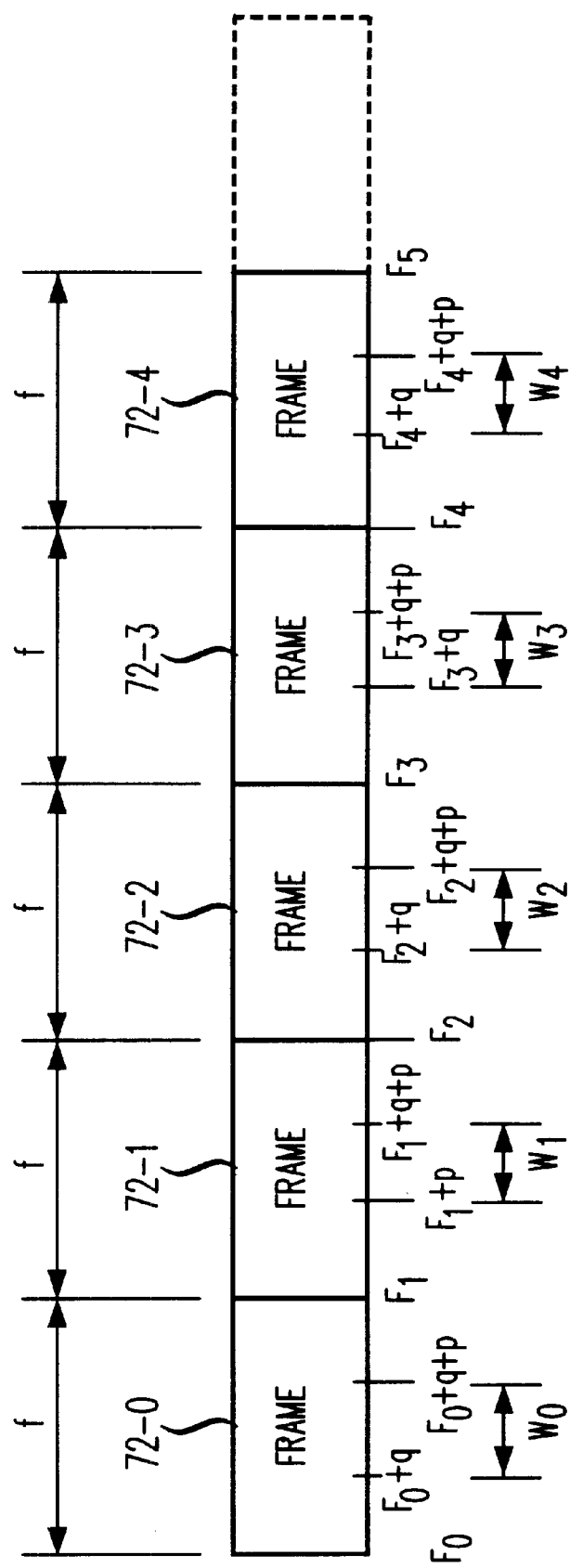
FIG. 5 depicts a timing schedule for a timing protocol used in accordance with one embodiment of the present invention.

In one embodiment of the present invention, base station 30 is operable to detect signals transmitted from mobile-telephone 38 using a modified timing protocol incorporating shifted or offset search windows $W_n$. FIG. 5 illustrates a timing schedule 70 for a timing protocol used in accordance with this embodiment of the present invention. In accordance with the timing schedule 70, base station 30 is configured to begin transmitting signals at the frame boundaries, and search for mobile-telephone signals within shifted search windows $W_n$ spanning from time $F_n$+q and ending no later than time $F_n$+q+p. Likewise, mobile-telephone 38 is configured to begin transmitting signals at some multiple x of a frame time interval (i.e., fx) after the mobile-telephones begin receiving base station signals. Like timing schedule 50, base station 30 using timing schedule 70 will begin to receive signals transmitted from mobile-telephone 38 within the (shifted) search window $W_n$.

Figure 6:
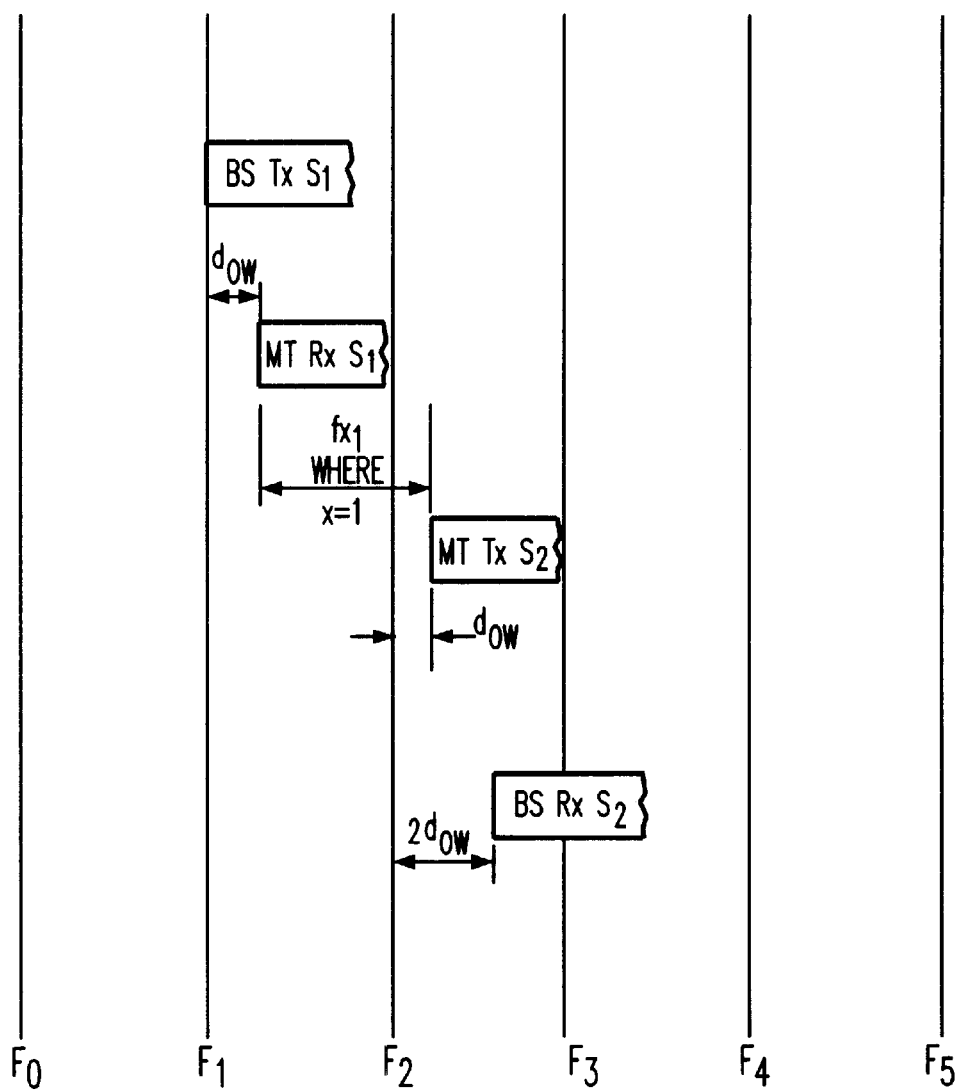
FIG. 6 depicts a time chart illustrating a sequence of transmissions and receptions by a base station and a mobile-telephone located within an extension of a cell.

FIG. 6 depicts a time chart 60 illustrating a sequence of transmissions and receptions in accordance with the timing protocol of FIG. 5 by base station 30 and mobile-telephone 38, which may be located anywhere within cell 34. Base station 30 begins transmitting base station signal $S_1$ at time $F_1$. Transmission of signal $S_1$ at time $F_n$ by base station 30 will result in the reception of signals transmitted by mobile-telephones 38 within shifted search windows $W_n$ such that the mobile-telephone signals may be detected and demodulated by base station 30 notwithstanding that mobile-telephone 38 is beyond the access range of the ASIC correlator bit limitation.

Mobile-telephone 38 begins receiving signal $S_1$ at time $F_1+d_{ow}$, where $d_{ow}$ is the one way propagation delay from base station 30 to mobile-telephone 38 (or from mobile-telephone 38 to base station 30). Since mobile-telephone 38 is in cell 34, the propagation delay $d_{ow}$ should correspond to a time necessary for a signal to travel at least a distance $R_{inner}$. Note that for ease of discussion, the propagation delay from base station 30 to mobile-telephone 38 is assumed to be identical to the propagation delay from mobile-telephone 38 to base station 30. If mobile-telephone 38 transmits a mobile-telephone signal $S_2$ to base station 30, mobile-telephone 38 waits some multiple of a frame time interval (i.e., fx) from when mobile-telephone 38 began receiving signal $S_1$ before it begins transmitting signal $S_2$. Thus, mobile-telephone 38 will begin transmitting signal $S_2$ at some time $F_1+d_{ow}+fx$ (or time $d_{ow}$ after some frame boundary). Because of the propagation delay $d_{ow}$ from mobile-telephone 38 to base station 30, base station 30 will begin receiving signal $S_2$ at some time $F_1+d_{ow}+fx+d_{ow}$ (or $F_1+2\,d_{ow}+fx$). Since 2 $d_{ow}$ corresponds to a time necessary for a signal traveling at least round trip between the base station and a distance $R_{inner}$, the signals should be positioned to be received between time $F_n$ (i.e., the s frame boundary) and time $F_n$+p, where p=416 μs corresponding to the ASIC correlator bit limitation (or within the confines of search windows $W_n$). Signal $S_2$ is then detected and processed using techniques well-known in the art.

It should be noted that a base station incorporating only the modified timing protocol of the present invention may not be able to detect mobile-telephone signals transmitted by mobile-telephones located within cell 32. To be capable of detecting such mobile-telephone signals, the present invention uses a timing protocol different from the timing protocol being used to communicate with mobile-telephones located within cell 34, as will be described herein.

Figure 7:
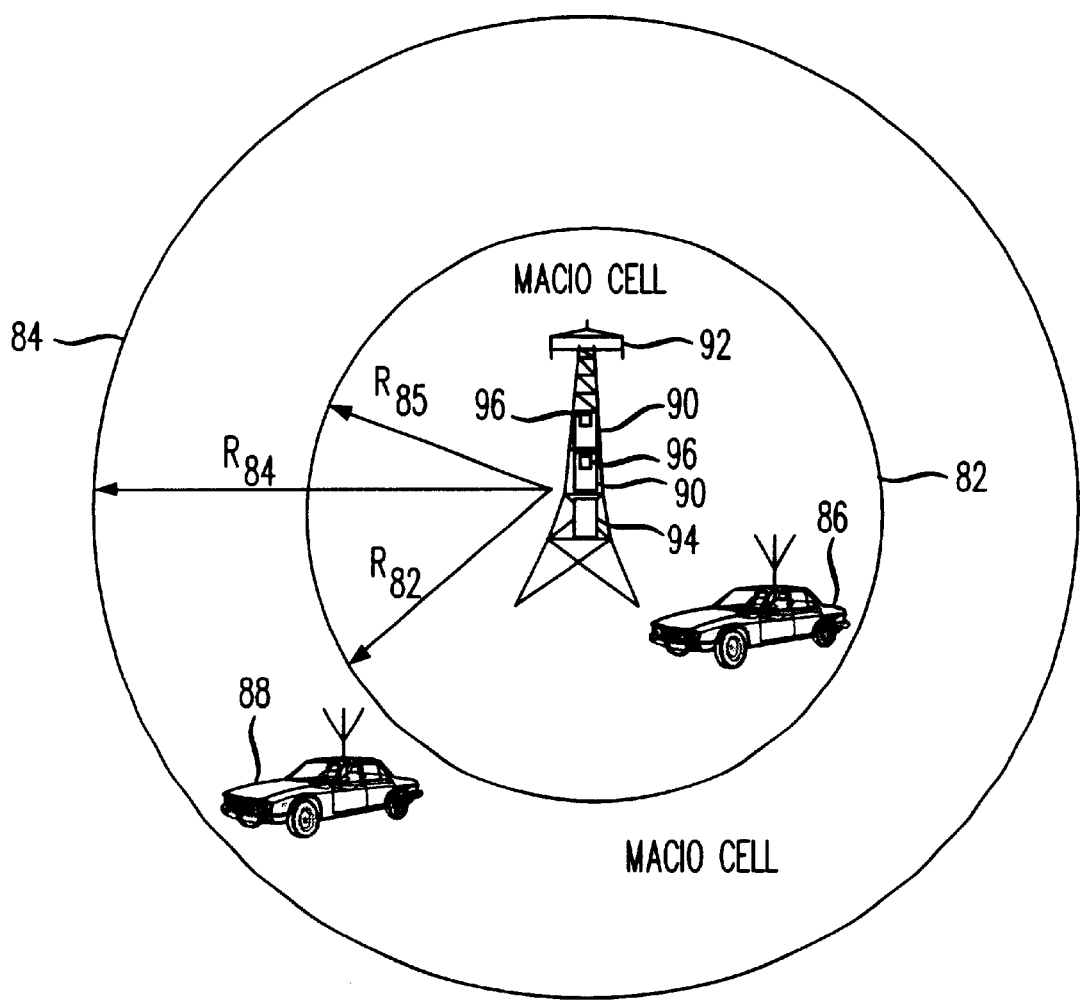
FIG. 7 depicts a base station having a hierarchical cell structure used in accordance with the present invention.

FIG. 7 depicts a base station 80 having a hierarchical cell structure used in accordance with the present invention. Base station 80 has associated a micro cell 82 and a macro cell 84. Micro cell 82 has a micro cell radius $R_{micro}$ or $R_{82}$, wherein micro cell radius $R_{micro}$ is less than or equal to a distance corresponding to the ASIC correlator bit limitation (e.g., $R_{micro} \leq 39$ miles). Macro cell 84 has an outer macro cell radius $R_{macro-outer}$ or $R_{84}$ and an inner macro cell radius $R_{macro-inner}$ or $R_{85}$, wherein inner macro cell radius $R_{macro-inner}$ is greater than zero and less than or equal to $R_{micro}$, and the difference ΔR between the macro cell radii $R_{macro-outer}$ and $R_{macro-inner}$ should be no greater than the distance corresponding to the ASIC correlator bit limitation (e.g., $\Delta R \leq 39$ miles for a 12 bit ASIC correlator). Although FIG. 8 shows micro cell 82 and macro cell 84 as two distinct cells, it should be understood that micro cell 82 and macro cell 84 may also partially overlap.

Base station 80 comprises a plurality of radios 90, one or more antennas 92 and a GPS receiver 94. Each of the plurality of radios 90 are operable to modulate and demodulate signals using a same frequency band freq, which includes an uplink and a downlink frequency channel. Each radio 90 includes at least one correlator 96 implemented in the form of an ASIC. Antennas 92 are operable to transmit and receive signals using the frequency band freq. Base station 80 (or radios 90) is configured to transmit signals using frequency band freq such that mobile-telephones located within micro and macro cells 82, 84 receive pilot signals (transmitted by base station 80) with an acceptable signal strength.

Base station 80 provides wireless communications services to mobile-telephones, such as mobile-telephone 86, in micro cell 82 using the frequency band freq and a first timing protocol. The first timing protocol, in one embodiment, is the timing protocol currently being employed in IS-95 based CDMA wireless communications system, as described earlier in the Background section. By contrast, base station 80 provides wireless communications services to mobile-telephones, such as mobile-telephone 88, in macro cell 84 using a second timing protocol but the same frequency band. The second timing protocol, in one embodiment, is the aforementioned modified timing protocol depicted in FIG. 5. In this embodiment, the first timing protocol has associated a first search window $W_{1-n}$ that begins at frame boundaries and ends at some time $p_1$ after the frame boundaries, wherein $p_1$ represents the time interval corresponding to the bit limitation of an ASIC correlator being used to represent the first search window $W_{1-n}$. The second timing protocol has associated a second search window $W_{2-n}$ that begins after the frame boundary but no later than the time $p_1$ after the frame boundaries and ends at some time $p_2$ after the second search window $W_{2-n}$ began, wherein $p_2$ represents the time interval corresponding to the bit limitation of an ASIC correlator being used to represent the second search window.

Figure 8:
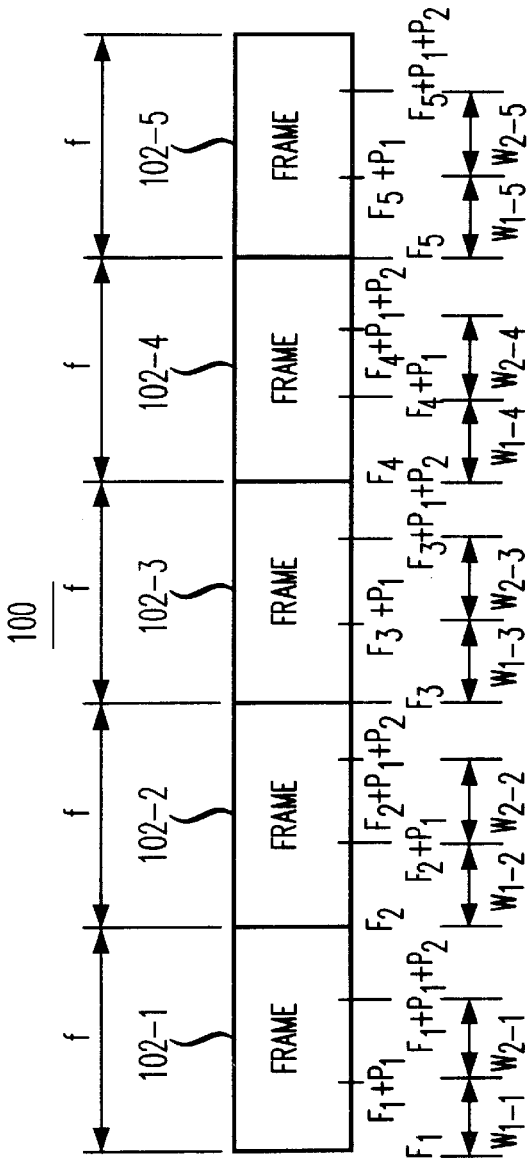
FIG. 8 depicts a timing schedule incorporating a first and a second timing protocol used by the base station of FIG. 7.

A timing schedule 100 for the first and second timing protocols is shown in FIG. 8, in accordance with one embodiment. The timing schedule 100 includes a series of frames 102-n, wherein each frame 102-n spans a time interval f, and the beginning of each frame 102-n is marked by a frame boundary at time $F_n$ aligned with GPS time using the GPS receiver 94. In accordance with the first and second timing protocols, base station 80 is configured to begin transmitting base station signals using the frequency band freq at the frame boundaries, and search for mobile-telephone signals using the frequency band freq within first search windows $W_{1-n}$ spanning from time $F_n$ and ending no later than time $F_n+p_1$. In accordance with the second timing protocol, base station 80 is configured to begin transmitting base station signals using the same frequency band freq at the frame boundaries, and search for mobile-telephone signals using the frequency band freq within second search windows $W_{2-n}$ which begins after the frame boundary but no later than the time $p_1$ and ends some time $p_2$ after the second search window began. For purposes of illustration, the second search window $W_{2-n}$ is shown as beginning when the first search window $W_{1-n}$ ends. This should not be construed to limit the present invention in any manner.

Regardless of the timing protocol, mobile-telephones 86, 88 are configured to begin transmitting signals at some multiple x of a frame time interval (i.e., fx) after the mobile-telephones began receiving base station signals, where x is some integer greater or equal to zero. When signals arrive at base station 80, base station 80 will search the incoming signals for the presence of mobile-telephone signals using both search windows $W_{1-n}$ and $W_{2-n}$. If the signal was transmitted by a mobile-telephone in micro cell 82, then base station 80 should detect the mobile-telephone signal within the first search window $W_{1-n}$. If the signal was transmitted by a mobile-telephone in macro cell 84, then base station 80 should detect the mobile-telephone signal within the second search window $W_{2-n}$.

In one embodiment, base station 80 uses different radios to search each search windows $W_{1-n}$, $W_{2-n}$. In another embodiment, base station 80 uses one radio to search both search windows $W_{1-n}$, $W_{2-n}$. In yet another embodiment, base station 80 would not search the second search window $W_{2-n}$ for mobile-telephone signals unless base station 80 did not detect any mobile-telephone signals in the first search window $W_{1-n}$.

Figure 9:
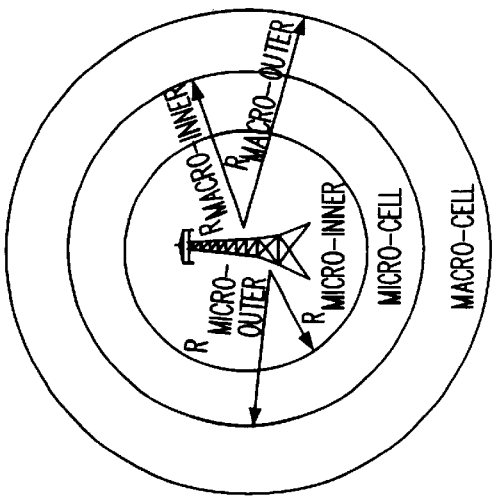
FIG. 9 depicts a base station with a micro cell and a macro cell, wherein the micro and macro cells both have an inner and an outer radius.

Although the present invention has been described in considerable detail with reference to certain embodiments, other versions are possible. For example, the present invention is also applicable to base stations with a micro cell and a macro cell having inner and outer radii, see FIG. 9, and wireless communication systems employing other types of multiple access techniques, such as time division multiple access. Therefore, the spirit and scope of the present invention should not be limited to the description of the embodiments

I claim:

1. A method for detecting a mobile-telephone signal comprising the steps of:

transmitting a base station signal at a first frame boundary;

searching at the base station for a mobile-telephone signal using a first search window beginning at a second frame boundary and ending at a time $p_1$ after the second frame boundary, wherein $p_1$ represents a time interval corresponding to a bit limitation for a first correlator; and searching at the base station for the mobile-telephone signal using a second search window beginning after the second frame boundary but no later than the time $p_1$ after the second frame boundary and ending at a time $p_2$ after the second search window began, wherein $p_2$ represents a time interval corresponding to a bit limitation for a second correlator.

2. The method of claim 1 further comprising the step of: detecting the mobile-telephone signal using a correlator.

3. The method of claim 2, wherein the mobile-telephone signal is detected when a resulting signal of an incoming signal multiplied with a known code exceeds a threshold.

4. The method of claim 3, wherein the known code is a pseudo-random noise sequence.

5. The method of claim 1, wherein the first frame boundary and the second frame boundary are identical.

6. The method of claim 1, wherein the first frame boundary and the second frame boundary are not identical.

7. A method for detecting a mobile-telephone signal comprising the steps of:

transmitting a base station signal at a first frame boundary;

searching at the base station for a mobile-telephone signal using a first search window beginning at a second frame boundary and ending at a time $p_1$ after the second frame boundary, wherein $p_1$represents a time interval corresponding to a bit limitation for a first correlator; and searching at the base station for the mobile-telephone signal using a second search window beginning after the second frame boundary but no later than the time $p_1$ after the second frame boundary and ending at a time $p_2$ after the secone seach window began, wherein $p_2$ represents a time interval corresponding to a bit limitation for a second correlator, wherein the step of searching for the mobile-telephone signal using the second search window is performed only if the nobil-telephone signal is not detected by the step of searching for the mobile-telephone signal using the first search window.

8. The method of claim 1, wherein the first correlator and second correlator are the same.

9. The method of claim 1, wherein the first correlator and second correlator are not the same.

10. A base station comprising:

a first radio for transmitting base station signals at a frame boundary, the first radio having a first correlator configured to search for mobile-telephone signal during a first time interval beginning at the frame boundary and ending a time $p_1$ after the frame boundary, wherein $p_1$ represents a time interval corresponding to a bit limitation for the first correlator; and a second radio co-located with the first radio for transmitting base station signals at a time r relative to the frame boundary, the second radio having a second correlator configured to search for the mobile-telephone signal during a second time interval beginning after the frame boundary but to later than time $p_1$ after the frame boundary and ending at a time $p_2$ after the second time interval began, wherein $p_2$ represents a time interval corresponding to a bit limitation for the second correlator.

11. The base station of claim 10, wherein the first correlator detects the mobile-telephone signals when a resulting signal of an incoming signal multiplied with a known code exceeds a threshold value.

12. The base station of claim 10, wherein the second correlator detects the mobile-telephone signals when a resulting signal of an incoming signal multiplied with a known code exceeds a threshold value.

13. The base station of claim 10 further comprising:

a GPS receiver for receiving timing information for aligning the frame boundaries.

\* \* \* \* \*